(12) United States Patent
Gulbahar et al.

(10) Patent No.: US 11,340,166 B2
(45) Date of Patent: May 24, 2022

(54) IDENTIFICATION TAG AND METHOD OF IDENTIFYING AN OBJECT

(71) Applicants: Vestel Elektronik Sanayi ve Ticaret A.S., Manisa (TR); Ozyegin University, Istanbul (TR)

(72) Inventors: Burhan Gulbahar, Manisa (TR); Gorkem Memisoglu, Manisa (TR)

(*) Notice: Subject to any disclaimer, the term of this patent is extended or adjusted under 35 U.S.C. 154(b) by 300 days.

(21) Appl. No.: 16/635,954

(22) PCT Filed: Oct. 6, 2017

(86) PCT No.: PCT/EP2017/075484
§ 371 (c)(1),
(2) Date: Jan. 31, 2020

(87) PCT Pub. No.: WO2019/025018
PCT Pub. Date: Feb. 7, 2019

(65) Prior Publication Data
US 2020/0240916 A1 Jul. 30, 2020

(30) Foreign Application Priority Data
Jul. 31, 2017 (EP) .................................... 17184055

(51) Int. Cl.
*G01N 21/64* (2006.01)
*G06K 9/00* (2022.01)

(52) U.S. Cl.
CPC ........... *G01N 21/6428* (2013.01); *G06K 9/00* (2013.01); *G01N 2021/6441* (2013.01)

(58) Field of Classification Search
CPC ....... G01N 21/6428; G01N 2021/6441; G06K 9/00
See application file for complete search history.

(56) References Cited

U.S. PATENT DOCUMENTS

| | | | |
|---|---|---|---|
| 7,868,157 B2* | 1/2011 | Reddington | C09B 23/0066 536/24.3 |
| 2004/0191786 A1* | 9/2004 | Yue | G01N 33/542 435/6.18 |
| 2009/0237501 A1 | 9/2009 | Lemmer | |
| 2013/0210001 A1 | 8/2013 | Lee | |
| 2014/0099630 A1* | 4/2014 | Nakata | G01N 21/6428 435/5 |

(Continued)

FOREIGN PATENT DOCUMENTS

| | | |
|---|---|---|
| WO | 2006/086889 A1 | 8/2006 |
| WO | 2010/012046 A1 | 2/2010 |
| WO | 2016/042025 A1 | 3/2016 |

*Primary Examiner* — Dominic J Bologna
(74) *Attorney, Agent, or Firm* — Brandon V. Zuniga; James R. Gourley; Carstens & Cahoon, LLP

(57) ABSTRACT

An identification tag has at least one molecule of a first type and at least one molecule of a second type. The molecules are capable of energy transfer according to Förster Resonance Energy Transfer, with one of the types being donor molecules and the other type being acceptor molecules. The tag has a substrate which has a plurality of locations at which molecules of the second type may be located. The light intensity emitted by the acceptor molecule(s) as the molecule of the first type is moved across the locations varies in dependence on whether a molecule of the second type is or is not located in the locations.

15 Claims, 4 Drawing Sheets

(56) References Cited

U.S. PATENT DOCUMENTS

| | | | |
|---|---|---|---|
| 2017/0370917 A1* | 12/2017 | Mackernan | C12N 9/1077 |
| 2019/0271647 A1* | 9/2019 | Grabmayr | G01N 33/587 |
| 2019/0323070 A1* | 10/2019 | Hassibi | C12Q 1/6818 |
| 2020/0025757 A1* | 1/2020 | Gopinath | G01N 21/47 |
| 2020/0200748 A1* | 6/2020 | Zafiu | G01N 33/552 |

* cited by examiner

IDENTIFICATION TAG AND METHOD OF IDENTIFYING AN OBJECT

CROSS REFERENCE TO RELATED APPLICATION

This application is a US 371 application from PCT/EP2017/075484 entitled "Identification Tag and Method of Identifying an Object" filed on Oct. 6, 2017 and published as WO 2019/025018 A1 on Feb. 7, 2019, which claims priority to EP Application 17184055.6 filed on Jul. 31, 2017. The technical disclosures of every application and publication listed in this paragraph are hereby incorporated herein by reference.

TECHNICAL FIELD

The present disclosure relates to an identification tag, a plurality of identification tags, and a method of identifying an object.

BACKGROUND

Identification tags may be fixed to some object in order to enable the object to be identified. Some identification tags provide for some identification signal to be obtained from the tag. In such cases, different tags are arranged to provide different identification signals.

SUMMARY

According to a first aspect disclosed herein, there is provided an identification tag, the tag comprising:
at least one molecule of a first type;
at least one molecule of a second type;
the molecules of the first and second types being capable of energy transfer according to Förster Resonance Energy Transfer wherein one of the first type and second type of molecule is a donor molecule and the other of the first type and second type of molecule is an acceptor molecule; and
a substrate on which a molecule of the second type is carried;
the substrate having a plurality of locations at which molecules of the second type may be located;
a molecule of the second type being located in one of the locations, there being no molecules of the second type in at least one other of the locations;
the molecule of the first type being movable across the locations of the substrate such that energy transfer according to Förster Resonance Energy Transfer can occur between the molecule of the first type and the molecule of the second type thereby to cause the acceptor molecule or molecules to emit light;
whereby the light intensity emitted by the acceptor molecule or molecules as the molecule of the first type is moved across the locations varies in dependence on whether a molecule of the second type is or is not located in the locations.

In an example, the locations of the substrate are linearly arranged, the arrangement being such that the movement of the molecule of the first type is a translational movement back and forth across the linearly arranged locations.

In an example, the identification tag comprises plural molecules of the second type, the molecules of the second type being located at different respective locations in the substrate.

In an example, the identification tag comprises an opening for admitting a pressure wave which in use drives movement of the molecule of the first type.

In an example, the identification tag comprises a carrier which carries the molecule of the first type.

In an example, the first type of molecule is a donor molecule and the second type of molecule is an acceptor molecule, whereby movement of the donor molecule across the acceptor molecule causes the acceptor molecule to emit light.

According to a second aspect disclosed herein, there is provided a method of identifying an object having an identification tag, the tag comprising at least one molecule of a first type and at least one molecule of a second type, the molecules of the first and second types being capable of energy transfer according to Förster Resonance Energy Transfer wherein one of the first type and second type of molecule is a donor molecule and the other of the first type and second type of molecule is an acceptor molecule, and a substrate having a plurality of locations at which molecules of the second type may be located, a molecule of the second type being located in one of the locations, there being no molecules of the second type in at least one other of the locations, the method comprising:
moving the molecule of the first type across the locations of the substrate such that energy transfer according to Förster Resonance Energy Transfer can occur between the molecule of the first type and the molecule of the second type thereby to cause the acceptor molecule or molecules to emit light;
detecting light emitted by the acceptor molecule or molecules as the molecule of the first type is moved across the locations; and
identifying the object according to the pattern of light intensity emitted by the acceptor molecule or molecules as the molecule of the first type is moved across the locations.

In an example, the locations of the substrate are linearly arranged, and the moving the molecule of the first type is a translational movement back and forth across the linearly arranged locations.

In an example, the tag comprises plural molecules of the second type, the molecules of the second type being located at different respective locations in the substrate.

In an example, movement of the molecule of the first type is driven by a pressure wave.

According to a third aspect disclosed herein, there is provided a plurality of identification tags, wherein:
each tag comprises:
at least one molecule of a first type;
at least one molecule of a second type;
the molecules of the first and second types being capable of energy transfer according to Förster Resonance Energy Transfer wherein one of the first type and second type of molecule is a donor molecule and the other of the first type and second type of molecule is an acceptor molecule; and
a substrate on which a molecule of the second type is carried, the substrate having a plurality of locations at which molecules of the second type may be located;
the molecule of the first type being movable across the locations of the substrate such that energy transfer according to Förster Resonance Energy Transfer can occur between the molecule of the first type and the molecule of the second type located in one of the locations of the substrate thereby to cause the acceptor molecule to emit light;
wherein, for at least two identification tags, the molecules of the second type are located in different locations in the respective identification tags such that the patterns of light intensity emitted by the acceptor molecules of the two identification tags as the molecules of the first type are moved across the locations in the respective identification tags is different.

In an example, for at least some of the identification tags, the locations of the substrate are linearly arranged, the arrangement being such that the movement of the molecule of the first type is a translational movement back and forth across the linearly arranged locations.

In an example, for at least some of the identification tags, the tag comprises plural molecules of the second type, the molecules of the second type being located at different respective locations in the substrate.

In an example, for at least some of the identification tags, the tag comprises an opening for admitting a pressure wave which in use drives movement of the molecule of the first type.

In an example, the first type of molecule is a donor molecule and the second type of molecule is an acceptor molecule, whereby movement of the donor molecule across the acceptor molecule causes the acceptor molecule to emit light.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
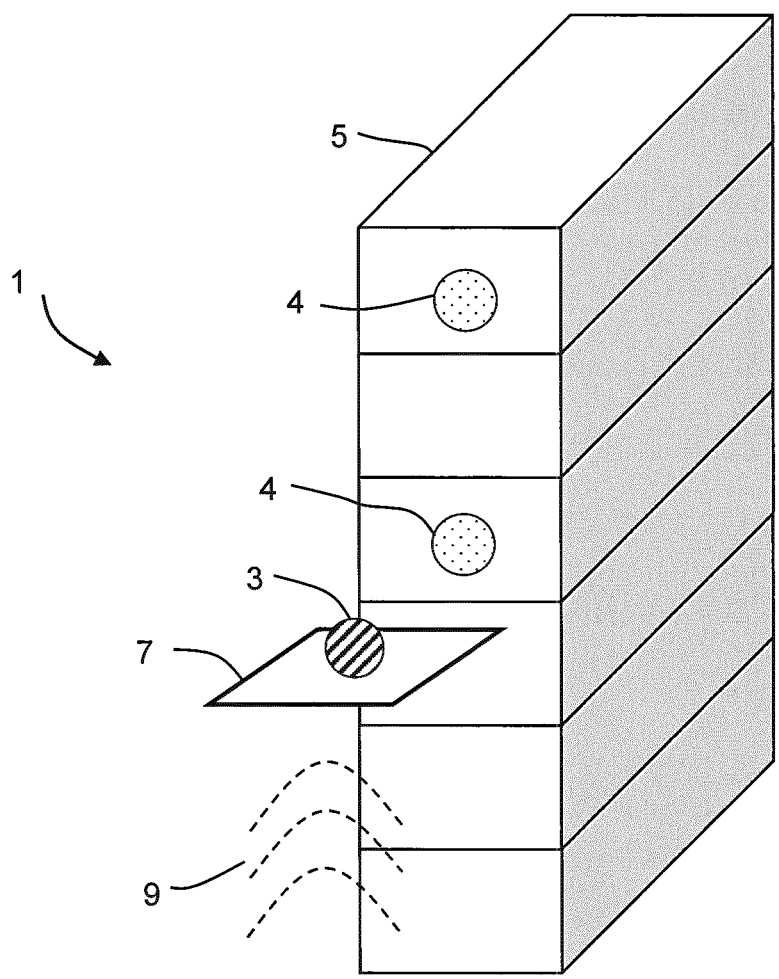
FIG. 1 shows a schematic perspective view of an example of an identification tag according to the present disclosure.

By way of introduction first, reference is made to the known "Förster Resonance Energy Transfer" (FRET). In FRET, energy is transferred from a first light-sensitive molecule (the "donor" molecule) to a second light-sensitive molecule (the "acceptor" molecule). The donor molecule is initially in an electronic excited state, and may be put into that excited state by light that is incident on the donor molecule. When the donor molecule is sufficiently close to the acceptor molecule, energy of the excited donor molecule is transferred to the acceptor molecule through non-radiative dipole-dipole coupling. The acceptor molecule may then emit light as a result. The efficiency of the energy transfer from the donor molecule to the acceptor molecule is inversely proportional to the sixth power of the distance between the donor molecule and the acceptor molecule. This means that FRET is extremely sensitive to small changes in distance between the donor molecule and the acceptor molecule. The distance between the donor molecule and the acceptor molecule for FRET to take place is much less than the wavelength of the light that is transferred, and may be in the range of for example 1 to 10 nm or so.

In examples described herein, there is provided an identification tag which makes use of FRET to emit light. The pattern of light intensity which is emitted depends on the arrangement of the molecules in the identification tag, as will be discussed in more detail below. Different tags have different arrangements of molecules, such that the patterns of light intensity which is emitted by the different tags is different. This enables a visual identification to be made, which may be made by eye and/or by some imaging apparatus with appropriate processing.

Referring now to the drawings, examples of identification tags according to embodiments will be described. The figures are not to scale and some show only a portion of the identification tags.

Figure 2A:
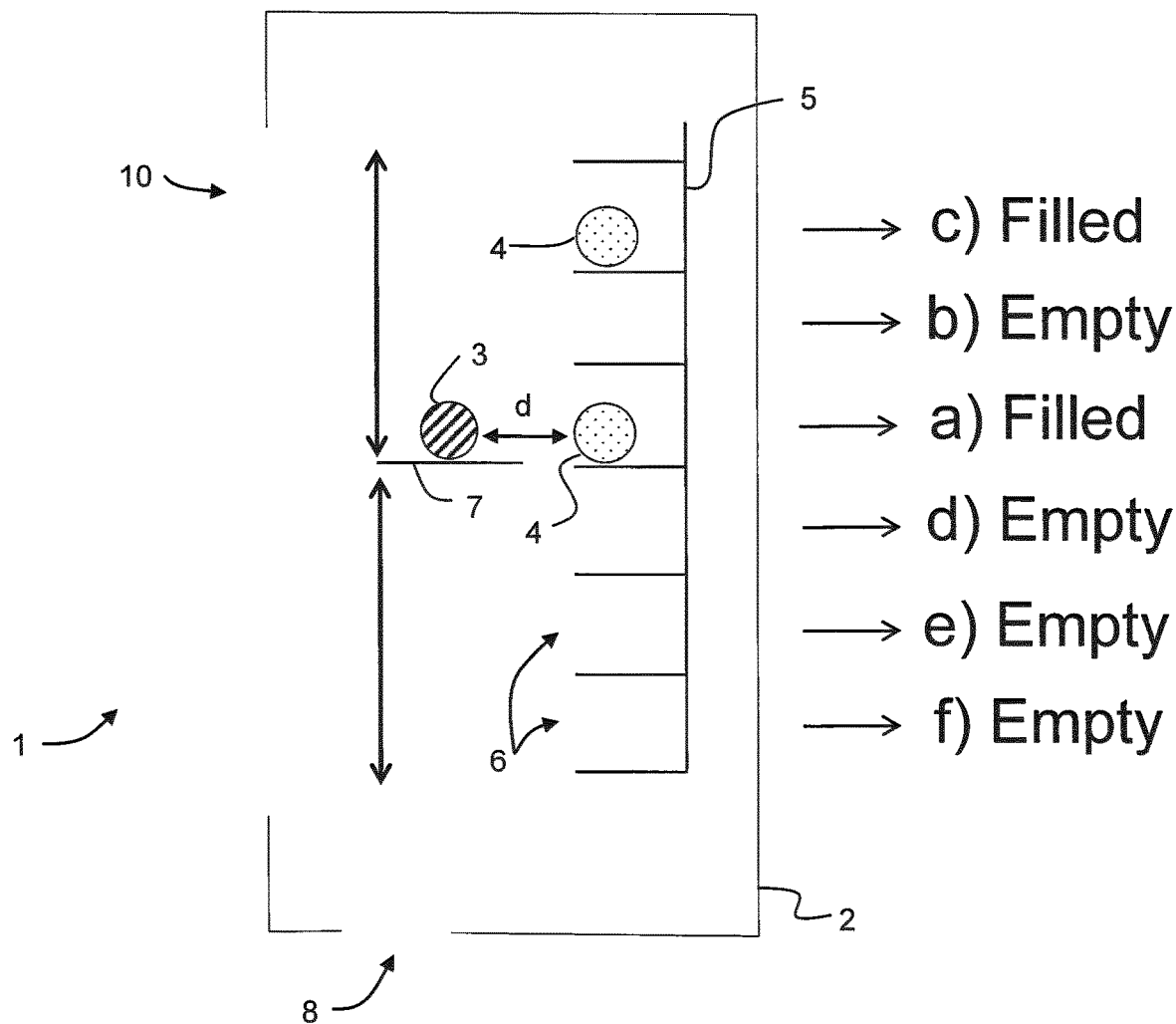
FIGS. 2A and 2B show schematically side views of two examples of identification tags according to the present disclosure.
Figure 2B:
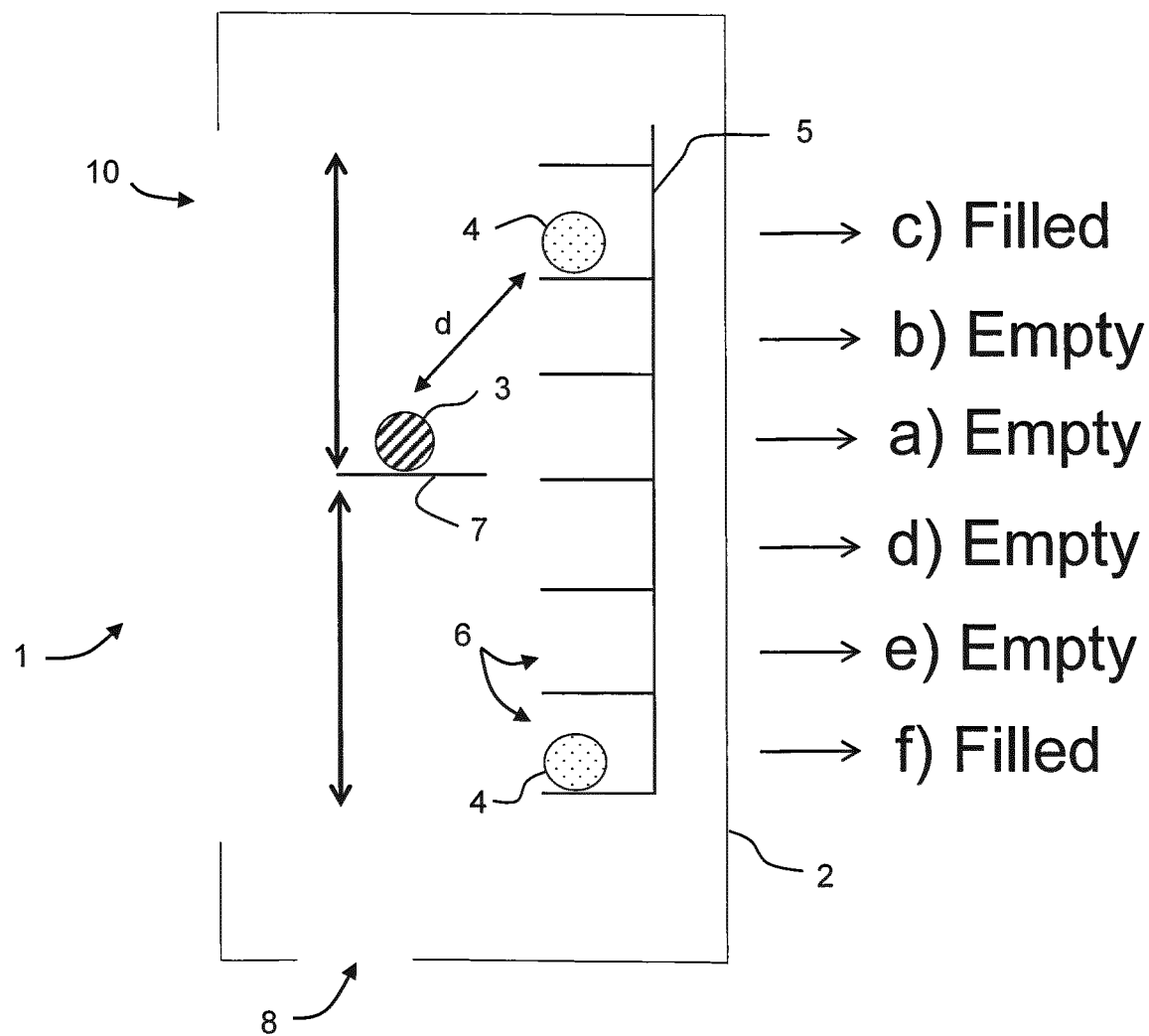

FIG. 1 shows a perspective view of a portion of an example of an identification tag 1 and FIGS. 2A and 2B show schematically side views of two examples of identification tags 1.

The identification tag 1 has a container or housing 2 (see FIGS. 2A and 2B) for containing the operative parts of the identification tag 1. The housing 2 in this example is formed of a strong material that is also lightweight. A number of plastics or metals are suitable for example. A preferred material is graphene. Graphene is formed of one or more layers of carbon atoms arranged in a repeating hexagonal pattern and is known to be a very strong, lightweight and durable material despite having atomic level thickness, and is capable of withstanding operation or use at high temperatures. Other so-called 2D topological materials or "single layer" materials may be used. The housing 2 is not indicated in FIG. 1 for reasons of clarity.

The identification tag 1 has at least one molecule 3 of a first type and at least one molecule 4 of a second type. The molecules 3, 4 of the first and second types are capable of energy transfer according to Förster Resonance Energy Transfer (FRET). Accordingly, one of the first type and second type of molecule is a donor molecule and the other of the first type and second type of molecule is an acceptor molecule. That is, the molecule 3 of the first type may be a donor molecule and the molecule 4 of the second type may be acceptor molecules or vice versa. Whether the molecule 3 of the first type is a donor molecule or an acceptor molecule and, correspondingly, the molecule 4 of the second type are acceptor molecules or donor molecules is a design choice, depending on for example the properties required of the identification tag 1 and on manufacturing convenience. For convenience and brevity, reference will be made herein to the molecule(s) 3 of the first type being a donor molecule(s) 3 and the molecule(s) 4 of the second type being acceptor molecule(s) 4, it being understood that the roles may be reversed in other examples.

The acceptor molecules 4 are supported or carried by a substrate 5. The acceptor molecule substrate 5 may be a single layer or a multilayer. The acceptor molecule substrate 5 in this example is formed of a strong material that is also lightweight. A number of plastics or metals are suitable for example. However, a preferred material is a so-called 2D topological material or "single layer" material. Examples include graphene, $MoS_2$, black phosphorus or phosphorene, etc. In this example, the acceptor molecule substrate 5 is fixed against movement (in this example, owing to the generally rigid structure of the acceptor molecule substrate 5 as well as the material of the acceptor molecule substrate 5). In other examples, the acceptor molecule substrate 5 may be arranged so as to resonate with a resonant frequency that is different from the resonant frequency of the donor molecule substrate or carrier 7 (see further below).

The substrate 5 for the acceptor molecule(s) 4 has a number of locations 6 at which acceptor molecules(s) 4 may be located. As will be explained further below, not all of the locations 6 may have an acceptor molecule 4. The locations 6 may be notional in the sense that the locations 6 merely define positions at which acceptor molecules(s) 4 may be located (and do not need to be defined by some physical arrangement of the substrate 5 for example). For clarity and simplicity, six locations 6 are indicated in the drawings, though the number of locations may be less than this or more than this in practice. The locations 6 are indexed a) to f) in FIGS. 2A and 2B.

The donor molecule 3 is supported or carried by another substrate or carrier 7. The donor molecule carrier or substrate 7 may be a single layer or a multilayer. The donor molecule carrier 7 may be formed of a metal or plastics for example. However, a preferred material is a so-called 2D topological material or "single layer" material. Examples include graphene, $MoS_2$, black phosphorus or phosphorene, etc.

The donor molecule carrier 7 is movable so as to move the donor molecule 3 across the locations 6 of the acceptor molecule substrate 5 in sequence. In an example, the identification tag 1 is arranged so that the donor molecule carrier 7 is movable by an incoming pressure wave, such as a sound wave. For example, the housing 2 may have an opening 8 arranged generally along the direction of movement of the donor molecule carrier 7 to admit a sound wave 9 into the housing 2 to bear on the donor molecule carrier 7. The sound wave 9 bearing on the donor molecule carrier 7 leads to a reciprocating movement of the donor molecule carrier 7 back and forth across the acceptor molecule substrate 5. The donor molecule carrier 7 may be arranged so as to resonate at a resonant frequency which is the same as or corresponds to the frequency of the incoming sound or pressure waves 9.

The identification tag 1 is arranged so that light can be incident on the donor molecule 3. Depending on the material of the donor molecule 3 and/or specific requirements, the light may be ambient light, which means that the identification tag 1 requires no power and may be a passive device. Alternatively or additionally, the incident light may be from a specific light source (not shown) which may be electrically powered for example. The identification tag 1 in this example has one or more entrance windows 10 for admitting light to be incident on the donor molecule 3. The light that is incident on the donor molecule 3 causes the donor molecule 3 to transition to an electronic excited state.

As the donor molecule carrier 7 moves, the donor molecule 3 is driven to move across the locations 6 of the acceptor molecule substrate 5 in sequence. As discussed above, when the electronically excited donor molecule 3 is sufficiently close to an acceptor molecule 4 which is located at one of the locations 6, such as within a distance of for example 1 to 10 nm or so, energy transfer according to FRET takes place. That is, once the distance d between the donor molecule 3 and an acceptor molecule 4 is less than the minimum distance required for FRET, energy is transferred by the donor molecule 3 emitting a photon that is accepted by the corresponding acceptor molecule 4. When the acceptor molecule 4 receives or accepts the photon emitted by the donor molecule, the acceptor molecule 4 enters an electron excited state. (In fact, FRET is analogous to near-field communication, in that the radius of interaction is much smaller than the wavelength of light emitted. As such, the photon that is emitted by the donor molecule 3 is a virtual photon which is instantly absorbed by a receiving acceptor molecule 4.) Subsequently, and typically practically instantaneously, the acceptor molecule 4 spontaneously relaxes to a lower state or a rest state by emitting a (real) photon. The photon emitted by the acceptor molecule 4 leaves the housing 2 through an exit window, which may be the same window 10 that admits light to excite the donor molecule 3 or one or more separate windows in the housing 2. The housing 2 may be for example entirely open or transparent to light (at least at the relevant frequencies) at least along one side or entirely. The important thing is that light can enter the housing 2 and can leave the housing 2. As in this example a sound wave 9 is used to drive the movement of the donor molecule 3, the identification tag 1 may be regarded as an acousto-optic identification tag.

This arrangement has a number of advantages in this respect. The identification tag 1 may be manufactured at approximately nanoscale dimensions. The sensitivity of the identification tag 1 to different volumes (amplitudes) of sound may be set or varied by for example setting or varying the maximum and/or minimum separation between the donor molecule 3 and the acceptor molecules 4 as the donor molecule 3 moves across the acceptor molecules 4.

Comparing now FIGS. 2A and 2B, the acceptor molecules 4 are arranged differently in the substrates 5 of the two identification tags 1. That is, acceptor molecules 4 are located in different locations 6 in the respective identification tags 1. The effect of this is that the patterns of light intensity emitted by the acceptor molecules 4 of the two identification tags 1 as the donor molecules 3 move across the locations 6 in the respective identification tags 1 is different. This enables identification of the tag 1, and therefore of an object to which the tag 1 is fixed, according to the pattern of light intensity emitted by the acceptor molecule(s) 4 as the donor molecule 3 is moved across the locations 6.

Figure 3A:
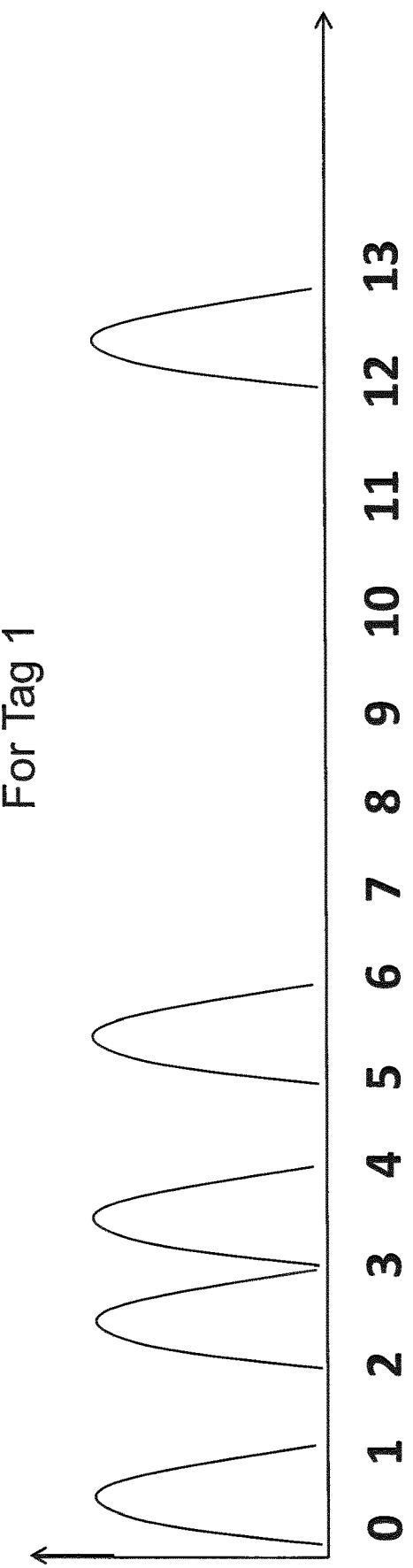
FIGS. 3A and 3B show plots of output light intensity against time for the example identification tags of FIGS. 2A and 2B.
Figure 3B:
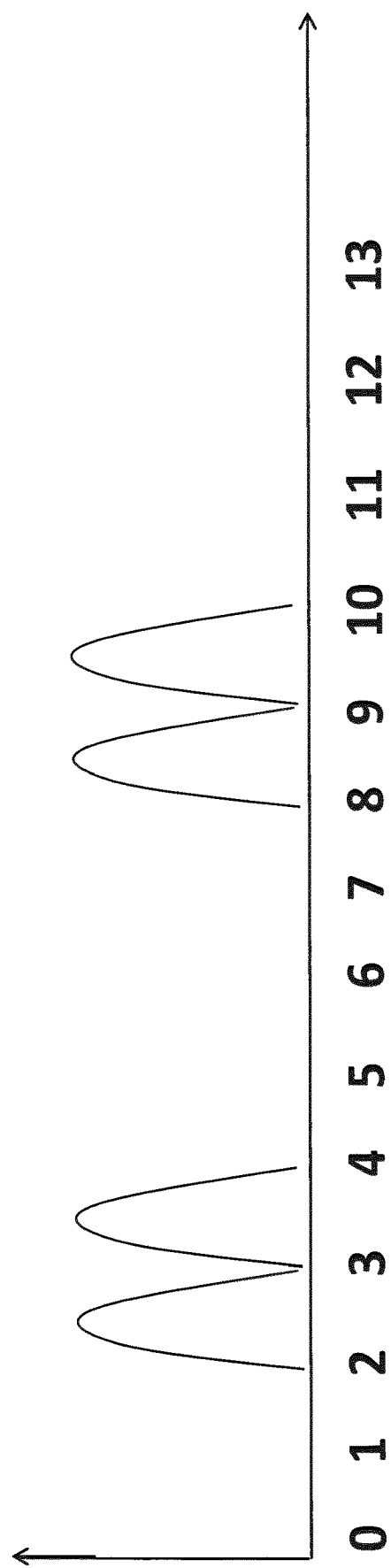

To see this, reference will now also be made to FIGS. 3A and 3B which show plots of output light intensity against time for the example identification tags 1 of FIGS. 2A and 2B.

Referring first to the example of a tag 1 shown in FIG. 2A and the corresponding plot of output light intensity shown in FIG. 3A, at time 0 (zero), the donor molecule 3 is positioned close to location a) of the acceptor molecule substrate 5. An acceptor molecule 4 is located at location a) of the acceptor molecule substrate 5 in this example. At this time, the distance d between the donor molecule 3 and the acceptor molecule 4 at location a) is less than the distance required for FRET to take place. Accordingly, at time 0, light is output by the acceptor molecule 4, as can be seen in FIG. 3A.

Then, in this example, at time 1 the donor molecule 3 has been moved over the next location b). In this example, there is no acceptor molecule 4 at location b). As a result, no light is output, as can be seen in FIG. 3A.

Subsequently, at time 2, the donor molecule 3 has been moved over the next location c). An acceptor molecule 4 is located at location c) of the acceptor molecule substrate 5 in this example. At this time, the distance d between the donor molecule 3 and the acceptor molecule at location c) is less than the distance required for FRET to take place. Accordingly, at time 2, light is output by the acceptor molecule 4, as can be seen in FIG. 3A.

In this example, the donor molecule 3 may continue to move in the same direction slightly but then returns to be close to the third location c) at time 3. That is, in this example, the donor molecule 3 moves back and forth over location c). Accordingly, at time 3, the distance d between the donor molecule 3 and the acceptor molecule at location c) is again less than the distance required for FRET to take place. Accordingly, at time 3, light is again output by the acceptor molecule 4, as can be seen in FIG. 3A.

This process continues as the donor molecule 4 moves over the locations b), a), d), e) and f) in sequence. The result in this case is no light being emitted at time 4 (corresponding to location b), light being emitted at time 5 (corresponding to location a) where there is an acceptor molecule 4), and no light being emitted at times 6, 7 and 8 (corresponding to locations d), e) and f) where there are no acceptor molecules 4). The movement of the donor molecule 4 then reverts to move over the locations f), e) and d) in sequence. Again, no acceptor molecules 4 are located at locations f), e) and d), so no light is emitted at times 9, 10 and 11.

In this example, with six locations 6 in the acceptor molecule substrate 5, the donor molecule 3 is back at the start position close to location a), corresponding to time 12 in FIG. 3A at which light is again emitted by the acceptor molecule 4 at location a). The donor molecule 3 may continue to be moved, resulting in a repeat of the pattern of light intensity emitted by the acceptor molecules 4, or the movement of the donor molecule 3 may cease at this point.

Accordingly, the specific arrangement of the acceptor molecules 4 in the locations 6 of the acceptor molecule substrate 5, with one or more locations 6 being filled with acceptor molecules 4 and one or more locations 6 not being filled with acceptor molecules 4, leads to a specific and corresponding pattern of light intensity that is output by the identification tag 1 as the donor molecule 3 moves across the locations 6. The pattern of light intensity will therefore be different for different tags 1 that have different arrangements for the acceptor molecules 4 in the locations 6. This enables the particular tag 1 to be identified, enabling an object to which the tag 1 is fixed to be identified.

This can be seen by referring to the second example of a tag 1 shown in FIG. 2B and the corresponding plot of output light intensity shown in FIG. 3B. In the example of FIG. 2B, acceptor molecules 4 are located at positions c) and f). Starting at time 0 with the donor molecule 3 positioned adjacent location a) and moving first over location b), no light is emitted at times 0 and 1 as no acceptor molecules 4 are located at locations a) and b). At times 2 and 3, light is emitted by the acceptor molecule 4 located at location c). Then, no light is emitted at times 4, 5, 6, or 7 as the donor molecule 3 moves over the empty locations b), a), d) and e) in turn. Light is then emitted at times 8 and 9 as the donor molecule 3 moves back and forth over the acceptor molecule 3 located at location f). This process continues, with no light being emitted at times 10 and 11 as donor molecule 3 moves over the empty locations e) and d). The donor molecule 3 may continue to be moved, resulting in a repeat of the pattern of light intensity emitted by the acceptor molecules 4, or the movement of the donor molecule 3 may cease at this point.

The different patterns of light intensity emitted by tags 1 having different arrangements for the acceptor molecules 4 may be detected by eye. It will be appreciated that in practice, the patterns of light intensity will appear to the eye as a "blinking" pattern, and that may be sufficient for a human observer to judge the different patterns. Alternatively or additionally, the different patterns of light intensity emitted by tags 1 having different arrangements for the acceptor molecules 4 may be detected by some imaging apparatus, such as a (digital) camera, with appropriate image processing being carried out to discern the different patterns.

Whilst in the above examples, there is always at least one acceptor molecule 4 at a location 6 in the tags 1 and there is always one empty location 6 in the tags 1, some tags 1 may have all locations 6 filled with acceptor molecules 4 and some tags 1 may have no locations 6 filled with acceptor molecules 4.

At least one of the donor molecule 3 and the acceptor molecule 4 may be in the form of a quantum dot. A quantum dot is a nanoscale particle having quantum properties, which may include their optical and/or electronic properties, which differ from the properties of particles made of similar materials, but at larger scales, as a result of quantum effects. Thus, for example, at least one of the donor molecule 3 and the acceptor molecules 4 may be coated onto a nanoscale particle or otherwise embodied as a quantum dot, and the optical properties of the donor molecule 3 and/or of the acceptor molecule 4 may be varied according to choice, by adjusting one or more properties of the nanoscale particles, such as their size and/or shape.

The window or windows 10 may be provided with a filter and/or a lens. These allow the properties of the light incident on the donor molecule 3 and the light emitted by the acceptor molecules 4 to be controlled accordingly.

A well-known and commonly used type of identification tag is an RFID (radio-frequency identification) tag. Compared to RFID tags, some examples of identification tags 1 as described herein have a number of advantages. First, at least some identification tags 1 as described herein use acoustic and ambient light energy for energy harvesting and excitation and frequency modulation. Both the ambient acoustic signals and light intensity can be stochastic or noise like. On the other hand, RFID tags require at least a specific RF radiation, even if the RFID tag is a "passive" tag. Secondly, at least some identification tags 1 as described herein can be manufactured with nanoscale ($10^{-9}$ m) or microscale ($10^{-6}$ m) dimensions, whereas RFID tags tend to have a size of a few millimetres. Thirdly, at least some identification tags 1 as described herein can be much more lightweight, durable and resistant to high temperature (and even low temperature) than RFID tags.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An identification tag, the tag comprising:
    at least one molecule of a first type;
    at least one molecule of a second type;
    the molecules of the first and second types being capable of energy transfer according to Forster Resonance Energy Transfer wherein one of the first type and second type of molecule is a donor molecule and the other of the first type and second type of molecule is an acceptor molecule; and
    a substrate on which a molecule of the second type is carried;
    the substrate having a plurality of locations at which molecules of the second type may be located;
    a molecule of the second type being located in one of the locations, there being no molecules of the second type in at least one other of the locations;
    the molecule of the first type being movable across the locations of the substrate such that energy transfer according to Forster Resonance Energy Transfer can occur between the molecule of the first type and the molecule of the second type thereby to cause the acceptor molecule or molecules to emit light;

whereby the light intensity emitted by the acceptor molecule or molecules as the molecule of the first type is moved across the locations varies in dependence on whether a molecule of the second type is or is not located in the locations.

2. An identification tag according to claim 1, wherein the locations of the substrate are linearly arranged, the arrangement being such that the movement of the molecule of the first type is a translational movement back and forth across the linearly arranged locations.

3. An identification tag according to claim 1, comprising plural molecules of the second type, the molecules of the second type being located at different respective locations in the substrate.

4. An identification tag according to claim 1, comprising an opening for admitting a pressure wave which in use drives movement of the molecule of the first type.

5. An identification tag according to claim 1, comprising a carrier which carries the molecule of the first type.

6. An identification tag according to claim 1, wherein the first type of molecule is a donor molecule and the second type of molecule is an acceptor molecule, whereby movement of the donor molecule across the acceptor molecule causes the acceptor molecule to emit light.

7. A method of identifying an object having an identification tag, the tag comprising at least one molecule of a first type and at least one molecule of a second type, the molecules of the first and second types being capable of energy transfer according to Forster Resonance Energy Transfer wherein one of the first type and second type of molecule is a donor molecule and the other of the first type and second type of molecule is an acceptor molecule, and a substrate having a plurality of locations at which molecules of the second type may be located, a molecule of the second type being located in one of the locations, there being no molecules of the second type in at least one other of the locations, the method comprising:
moving the molecule of the first type across the locations of the substrate such that energy transfer according to Forster Resonance Energy Transfer can occur between the molecule of the first type and the molecule of the second type thereby to cause the acceptor molecule or molecules to emit light;
detecting light emitted by the acceptor molecule or molecules as the molecule of the first type is moved across the locations; and
identifying the object according to the pattern of light intensity emitted by the acceptor molecule or molecules as the molecule of the first type is moved across the locations.

8. A method according to claim 7, wherein the locations of the substrate are linearly arranged, and the moving the molecule of the first type is a translational movement back and forth across the linearly arranged locations.

9. A method according to claim 7, wherein the tag comprises plural molecules of the second type, the molecules of the second type being located at different respective locations in the substrate.

10. A method according to claim 7, wherein movement of the molecule of the first type is driven by a pressure wave.

11. A plurality of identification tags, wherein:
each tag comprises:
at least one molecule of a first type;
at least one molecule of a second type;
the molecules of the first and second types being capable of energy transfer according to Forster Resonance Energy Transfer wherein one of the first type and second type of molecule is a donor molecule and the other of the first type and second type of molecule is an acceptor molecule; and
a substrate on which a molecule of the second type is carried, the substrate having a plurality of locations at which molecules of the second type may be located;
the molecule of the first type being movable across the locations of the substrate such that energy transfer according to Forster Resonance Energy Transfer can occur between the molecule of the first type and the molecule of the second type located in one of the locations of the substrate thereby to cause the acceptor molecule to emit light;
wherein, for at least two identification tags, the molecules of the second type are located in different locations the respective identification tags such that the patterns of light intensity emitted by the acceptor molecules of the two identification tags as the molecules of the first type are moved across the locations in the respective identification tags is different.

12. A plurality of identification tags according to claim 11, wherein, for at least some of the identification tags, the locations of the substrate are linearly arranged, the arrangement being such that the movement of the molecule of the first type is a translational movement back and forth across the linearly arranged locations.

13. A plurality of identification tags according to claim 11, wherein, for at least some of the identification tags, the tag comprises plural molecules of the second type, the molecules of the second type being located at different respective locations in the substrate.

14. A plurality of identification tags according to claim 11, wherein, for at least some of the identification tags, the tag comprises an opening for admitting a pressure wave which in use drives movement of the molecule of the first type.

15. A plurality of identification tags according to claim 11, wherein the first type of molecule is a donor molecule and the second type of molecule is an acceptor molecule, whereby movement of the donor molecule across the acceptor molecule causes the acceptor molecule to emit light.

\* \* \* \* \*